US011955898B2

(12) United States Patent
Jia et al.

(10) Patent No.: US 11,955,898 B2
(45) Date of Patent: Apr. 9, 2024

(54) CHARGING AND DISCHARGING DEVICE AND CHARGING AND DISCHARGING SYSTEM OF ELECTRIC VEHICLE

(71) Applicant: Delta Electronics, Inc., Taoyuan (TW)

(72) Inventors: Minli Jia, Taoyuan (TW); Hao Sun, Taoyuan (TW); Jinfa Zhang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 82 days.

(21) Appl. No.: 17/368,856

(22) Filed: Jul. 7, 2021

(65) Prior Publication Data

US 2022/0045619 A1 Feb. 10, 2022

Related U.S. Application Data

(60) Provisional application No. 63/060,761, filed on Aug. 4, 2020.

(30) Foreign Application Priority Data

Jan. 29, 2021 (CN) .......................... 202110134937.8

(51) Int. Cl.
*H02M 3/335* (2006.01)
*H02J 7/00* (2006.01)
(Continued)

(52) U.S. Cl.
CPC ......... *H02M 3/33573* (2021.05); *H02J 7/007* (2013.01); *H02J 50/12* (2016.02);
(Continued)

(58) Field of Classification Search
CPC .. H02M 3/015; H02M 3/335; H02M 3/33573; H02M 3/33584; H02M 3/33592;
(Continued)

(56) References Cited

U.S. PATENT DOCUMENTS 5,404,092 A * 4/1995 Gegner .................. H02M 3/28
323/207
6,392,902 B1 5/2002 Jang et al.
(Continued)

FOREIGN PATENT DOCUMENTS

CN 102290999 A 12/2011
CN 103262403 A 8/2013
(Continued)

OTHER PUBLICATIONS

Chuanhong Zhao et al., "An Isolated Tree-Port Bidirectional DC-DC Converter With Decoupled Power Flow Management", IEEE Transactions on Power Electronics, Institute of Electrical and Elelctronics Engineers, USA, vol. 23, No. 5, Sep. 1, 2008.
(Continued)

*Primary Examiner* — Gary L Laxton
(74) *Attorney, Agent, or Firm* — CKC & Partners Co., LLC

(57) ABSTRACT

A charging and discharging device includes a transformer consisting of a primary winding and multiple secondary windings including at least a first secondary winding and a second secondary winding; multiple ports electrically connected to the primary winding and the multiple secondary windings of the transformer, respectively, wherein the multiple ports at least include a first port electrically connected to the primary winding via a first conversion circuit; a second port electrically connected to the first secondary winding via a second conversion circuit; and a third port electrically connected to the second secondary winding via a third conversion circuit; and a first controllable switch connected between the first conversion circuit and the primary winding.

19 Claims, 11 Drawing Sheets

(51) Int. Cl.
*H02J 50/12* (2016.01)
*H02M 3/00* (2006.01)
*H02M 7/5387* (2007.01)
*H02M 1/00* (2006.01)

(52) U.S. Cl.
CPC ....... *H02M 3/015* (2021.05); *H02M 3/33584* (2013.01); *H02M 3/33592* (2013.01); *H02M 7/5387* (2013.01); *H02M 1/0058* (2021.05); *H02M 1/008* (2021.05)

(58) Field of Classification Search
CPC .. H02M 7/5387; H02M 1/0058; H02M 1/008; H02J 50/12; H02J 7/007
See application file for complete search history.

(56) References Cited

U.S. PATENT DOCUMENTS

| | | | |
|---|---|---|---|
| 10,044,279 | B2 | 8/2018 | Guepratte et al. |
| 10,116,224 | B1 | 10/2018 | Tan et al. |
| 2008/0198632 | A1* | 8/2008 | Takayanagi ........... H02M 7/797 363/17 |
| 2011/0032731 | A1 | 2/2011 | Coleman et al. |
| 2014/0103860 | A1* | 4/2014 | Kominami .............. H02M 1/32 320/108 |
| 2014/0254223 | A1 | 9/2014 | Limpaecher |
| 2016/0020702 | A1 | 1/2016 | Trescases et al. |
| 2016/0322968 | A1 | 11/2016 | Mao et al. |
| 2017/0005584 | A1 | 1/2017 | Guepratte et al. |
| 2017/0104365 | A1 | 4/2017 | Ghosh et al. |
| 2017/0163163 | A1 | 6/2017 | Jang et al. |
| 2018/0034446 | A1 | 2/2018 | Wood |
| 2018/0222333 | A1 | 8/2018 | Khaligh et al. |
| 2019/0140639 | A1 | 5/2019 | Mao et al. |
| 2019/0393769 | A1 | 12/2019 | Wei et al. |
| 2020/0412237 | A1 | 12/2020 | Dai et al. |
| 2020/0412238 | A1 | 12/2020 | Zhu et al. |

FOREIGN PATENT DOCUMENTS

| | | |
|---|---|---|
| CN | 206452300 U | 8/2017 |
| CN | 107284273 A | 10/2017 |
| CN | 107623365 A | 1/2018 |
| CN | 108092517 A | 5/2018 |
| CN | 109167423 A | 1/2019 |
| CN | 109703399 A | 5/2019 |
| CN | 110112924 A | 8/2019 |
| CN | 110556901 A | 12/2019 |
| CN | 110649813 A | 1/2020 |
| CN | 110719035 A | 1/2020 |
| CN | 110774909 A | 2/2020 |
| CN | 111355398 A | 6/2020 |
| CN | 111463878 A | 7/2020 |
| CN | 111464040 A | 7/2020 |
| CN | 112583061 A | 3/2021 |
| WO | 2020096655 A1 | 5/2020 |

OTHER PUBLICATIONS

Bhattacharjee Amit Kumar et al., "Review of Multiport Converters for Solar and Energy Storage Integration", IEEE Transactions on Power Electronics, Institute of Electrical and Elelctronics Engineers, USA, vol. 34, No. 2, Feb. 1, 2019.

Krishnaswami H et al., "Three-Port Series-Resonant DC-DC Converter to Interface Renewable Energy Sources With Bidirectional Load and Energy Storage Ports," IEEE Transactions on Power Electronics, Institute of Electrical and Electronics Engineers, USA, vol. 24, No. 10, Oct. 1, 2009 (Oct. 1, 2009), pp. 2289-2297. *Figure 1*.

Heller M J et al., "Modulation Scheme Optimization for a Dual Three-Phase Active Bridge (D3AB) PFC Rectifier Topology," 2019 20th Workshop on Control and Modeling for Power Electronics (COMPEL), IEEE, Jun. 17, 2019 (Jun. 17, 2019), pp. 1-8. [retrieved on Jul. 22, 2019].

Sankala Arto et al., "Modular Double-Cascade converter with soft switching DC/DC isolation converter," 2013 15th European Conference on Power Electronics and Applications (EPE), IEEE, Sep. 2, 2013 (Sep. 2, 2013), pp. 1-9. *Prevention of transformer core saturation*.

Gang Liu et al., "Implementation of a 3.3-kW DC-DC Converter for EV On-Board Charger Employing the Series Resonant Converter With Reduced Frequency-Range Control," IEEE Transactions on Power Electronics, vol. 32, No. 6, Jun. 3, 2017, pp. 4168-4184.

Verma Vishal et al., "Performance Enhancement of the Dual Active Bridge with Dual Phase Shift Control and Variable Frequency Modulation", 2016 IEEE International Conference on Power Electronics, Drives and Energy Systems (PEDES), IEEE, Dec. 14, 2016, pp. 1-6, XP033090134, DOI: 10.1 109/PEDES.2016.7914523.

* cited by examiner

CHARGING AND DISCHARGING DEVICE AND CHARGING AND DISCHARGING SYSTEM OF ELECTRIC VEHICLE

CROSS-REFERENCE TO RELATED APPLICATIONS

This non-provisional application claims priority under 35 U.S.C. § 119(a) on Provisional Patent Application No. 63/060,761 filed in the United States on Aug. 4, 2020 and Patent Application No. 202110134937.8 filed in P.R. China on Jan. 29, 2021, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "Prior Art" to the present invention described herein. All references listed, cited and/or discussed in this specification are incorporated herein by reference in their entireties and to the same extent as if each reference was individually incorporated by reference.

BACKGROUND OF THE INVENTION

1. Field of the Invention

The invention relates to the field of electric vehicles, and particularly to a charging and discharging system of an electric vehicle and a charging and discharging device.

2. Related Art

A power distribution system inside an electric vehicle (such as, an EV car) mainly comprises three converters, which are an AC/DC converter for charging high-voltage batteries, i.e., On-Board-Charger (OBC), an LV DC/DC converter for converting a voltage of the high-voltage batteries into a low voltage, for example, 12V, to supply low voltage systems such as lights and speakers of the car, and a DC/AC converter for a drive motor system, which is the main source for the driving of the electric vehicle. In view of power levels, powers of the OBC and the LV DC/DC converter are much lower than the power of the DC/AC converter for the drive motor, so the OBC and the LV DC/DC converter are most possibly integrated into one device.

Currently, a magnetic integration of the OBC and the LV DC/DC converter is adopted. For example, FIG. 1 illustrates a system configuration architecture of a common three-port magnetic integration solution of the conventional EV car. Since uncontrolled rectification is used on an LV output side, energy cannot flow bi-directionally, and it is impossible for energy to pre-charge an output capacitor reversely. It may only pre-charge a bus capacitor Cbus of the motor M through a pre-charging circuit (shown by a dotted box in FIG. 1) consisting of a relay S and a resistor R.

However, as for the conventional three-port magnetic integration solution, due to the limitation of withstand voltage of a primary bus capacitor Cbus1, a turn ratio of a primary winding to an HV secondary winding of the transformer of the OBC portion in a discharging mode (i.e., discharging from the HV secondary side of the transformer to the primary bus side) must be designed to be proximate to 1 or less than 1. Although such a design can ensure the safety of a bus voltage, the charging efficiency of the OBC is not optimal. Moreover, a voltage on the LV side is usually in a range of 9V to 16V. If the turn number of the primary side is designed to be too small, 25 turns for example, then when the bus voltage is 420V and the turn number of an LV secondary side is 1, the voltage on the LV side is calculated to be 16.8V. If the voltage on the LV side is controlled to be 13.5V, reactive control has to be introduced. Even if the output power on the LV side is small, there is a large reactive loss. Therefore, on one hand, the current design causes incapability of optimizing the charging efficiency of the OBC, and on the other hand, when the design is improper, a large reactive current will be introduced on the LV side.

In addition, when the EV car is in an EV running mode, the primary side is in a no-load state, and an equivalent gain of the HV secondary side to the primary side of the OBC is high. Considering dynamic situations of independent operation from the HV side to the LV side, the bus voltage has a risk of over voltage, causing damage to a bus capacitor. In such a mode, to reduce the bus voltage, one method is to switch a circuit on the HV secondary side to an asymmetrical half-bridge. As such, there will be a large resonant current in the circuit on the HV side, turn-on loss of switches will increase, a rather large phase-shift angle will be introduced into the LV secondary side, the reactive current will increase, copper loss on the LV secondary side will increase, and efficiency will reduce.

Therefore, it is urgent to develop a new design to solve at least one deficiency of conventional technology.

SUMMARY OF THE INVENTION

An object of the invention is to provide a charging and discharging device and a charging and discharging system of an electric vehicle, in which a turn ratio design of a primary side to a secondary side of the transformer may not have limitation, a reactive current may be reduced, and efficiency may be enhanced.

In order to achieve the object, the invention provides a charging and discharging device, comprising: a transformer comprising a primary winding, and multiple secondary windings which at least comprising a first secondary winding and a second secondary winding; multiple ports electrically connected to the primary winding and the multiple secondary windings of the transformer, respectively, wherein the multiple ports at least comprise: a first port electrically connected to the primary winding through a first conversion circuit; a second port electrically connected to the first secondary winding through a second conversion circuit; and a third port electrically connected to the second secondary winding through a third conversion circuit; and a first controllable switch connected between the first conversion circuit and the primary winding; wherein a voltage at the first port of the charging and discharging device is a first voltage, a voltage at the second port is a second voltage, and a voltage at the third port is a third voltage.

To achieve the object, the invention further provides a charging and discharging system of an electric vehicle, comprising: the charging and discharging device, wherein a first port of the charging and discharging device is connected to a first charging and discharging unit, a second port of the charging and discharging device is connected to a second charging and discharging unit, and a third port of the charging and discharging device is connected to a third charging and discharging unit.

By adding a first controllable switch, the invention allows an unrestricted turn ratio design of a primary side to a secondary side of the transformer, largely reduces a reactive current, and improves efficiency. By turning off the first controllable switch in an EV running mode, the invention eliminates the need to switch the HV side circuit into a half-bridge mode, thereby reducing a resonant current and a switch loss, and improving efficiency.

The additional aspects and advantages of the invention are partially explained in the below description, and partially becoming apparent from the description, or can be obtained through the practice of the invention.

BRIEF DESCRIPTION OF THE DRAWINGS

The exemplary embodiments are described in detail with reference to the accompanying drawings, through which the above and other features and advantages of the invention will become more apparent.

DETAILED EMBODIMENTS OF THE INVENTION

Figure 1:
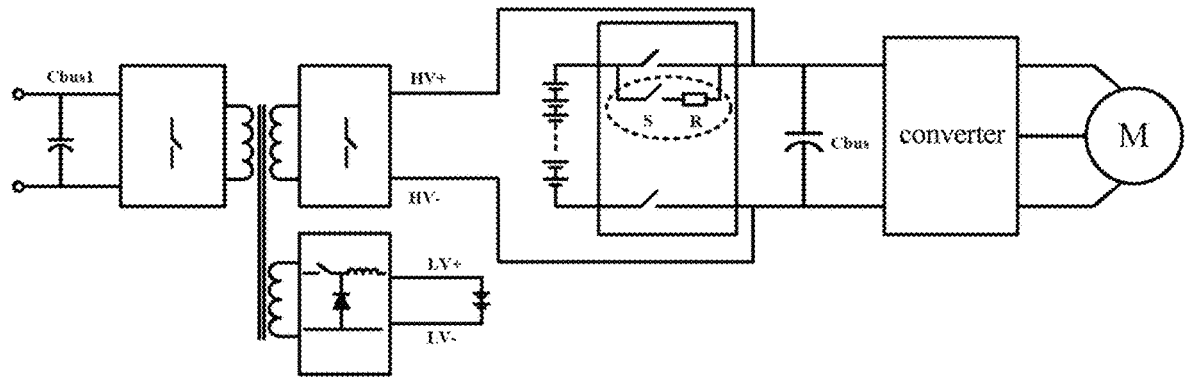
FIG. 1 is a schematic diagram of a system configuration architecture of a common three-port magnetic integration solution of the conventional electric car.

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this invention will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. The embodiments may use relative phrases, such as, "upper" or "lower" to describe a relative relation of one signed component over another component. It shall be understood that if the signed device reverses to turn upside down, the described component on an "upper" side will become a component on a "lower" side. In addition, the terms "first", "second" and the like in the claims are only used as signs, instead of numeral limitations to objects.

Figure 2:
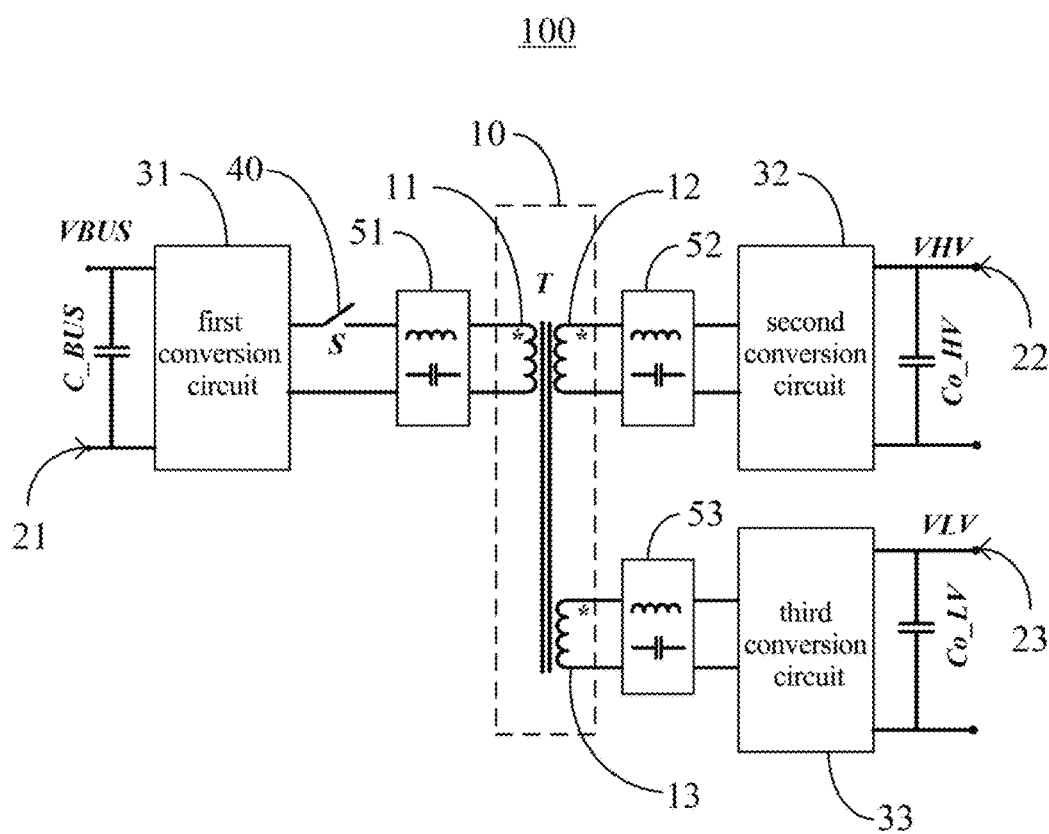
FIG. 2 is a structural diagram of a charging and discharging device according to the invention.

As shown in FIG. 2, a charging and discharging device 100 of the invention may comprise a transformer 10, multiple ports 21-23, and a first controllable switch 40. The transformer 10 comprises a primary winding 11, and multiple secondary windings comprising at least a first secondary winding 12 and a second secondary winding 13, for example. The multiple ports comprises at least a first port 21, a second port 22, and a third port 23, for example, and are electrically connected to the primary winding 11 and the multiple secondary windings 12, 13 of the transformer 10, respectively. The first port 21 is electrically connected to the primary winding 11 via a first conversion circuit 31, the second port 22 is electrically connected to the first secondary winding 12 via a second conversion circuit 32, and the third port 23 is electrically connected to the second secondary winding 13 via a third conversion circuit 33. A first controllable switch 40 is connected between the first conversion circuit 31 and the primary winding 11 and may, for example, be connected between a first end or a second end of the primary winding 11 and the first conversion circuit 31. The first controllable switch 40 may be, for example, a mechanical structure switch, such as a relay or a controllable bidirectional switch. A voltage at the first port 21 of the charging and discharging device 100 is a first voltage, a voltage at the second port 22 is a second voltage, and a voltage at the third port 23 is a third voltage. Preferably, the third voltage is less than the second voltage.

In the invention, the charging and discharging device 100 may further comprise a first filter capacitor C_BUS connected in parallel to the first port 21, a second filter capacitor Co_HV connected in parallel to the second port 22, and a third filter capacitor Co_LV connected in parallel to the third port 23. The first voltage at the first port 21 is a voltage VBUS on a BUS side, the second voltage at the second port 22 is a voltage VHV on an HV side, and the third voltage at the third port 23 is a voltage VLV on an LV side.

In the invention, the first conversion circuit 31 may be electrically connected to the primary winding 11 via a first resonance circuit 51, the second conversion circuit 32 may be electrically connected to the first secondary winding 12 via a second resonance circuit 52, and the third conversion circuit 33 may be electrically connected to the second secondary winding 13 via a third resonance circuit 53.

In the invention, the first port 21 may be electrically connected to a first charging and discharging unit, the second port 22 may be electrically connected to a second charging and discharging unit, and the third port 23 may be electrically connected to a third charging and discharging unit. When the charging and discharging device 100 is in one of the working modes where the first charging and discharging unit charges the second charging and discharging unit, where the first charging and discharging unit charges the second charging and discharging unit and the third charging and discharging unit simultaneously, where the second charging and discharging unit is discharged to the first charging and discharging unit, and where the second charging and discharging unit is discharged to the first charging and discharging unit while charging the third charging and discharging unit, the first controllable switch 40 is on. When the charging and discharging device 100 is in a working mode where the second charging and discharging unit supplies the third charging and discharging unit or a working mode where the third charging and discharging unit pre-charges the second charging and discharging unit, the first controllable switch 40 is off.

In the invention, when the charging and discharging device 100 is in a working mode where the third charging and discharging unit pre-charges the first charging and discharging unit or in a working mode where the second charging and discharging unit pre-charges the first charging and discharging unit, the first controllable switch 40 is on. For example, the charging and discharging device 100 of the invention may be a charger and has three ports including the first port 21, the second port 22, and the third port 23. Moreover, the second port 22, for example, may be electrically connected to a high-voltage battery, and the third port 23, for example, may be electrically connected to a low-voltage battery. When the charger needs to charge the high-voltage battery and/or the low-voltage battery, a capacitor on the BUS side (i.e., the first filter capacitor C_BUS) can be pre-charged through a bidirectional control technology based on a three-port circuit of the charging and discharging device 100 of the invention, which may be implemented in two manners. One is to pre-charge the capacitor on the BUS side through the low-voltage battery, with the first controllable switch 40 being in an on state, and the other is to pre-charge the capacitor on the BUS side through the high-voltage battery, with the first controllable switch 40 being in an on state. As compared to the conventional method, i.e., the AC/DC stage pre-charges the capacitor on the BUS side by adding one relay and a pre-charging resistor, the invention only adds one first controllable switch 40 (such as a relay) and is better in space and cost.

Figure 3:
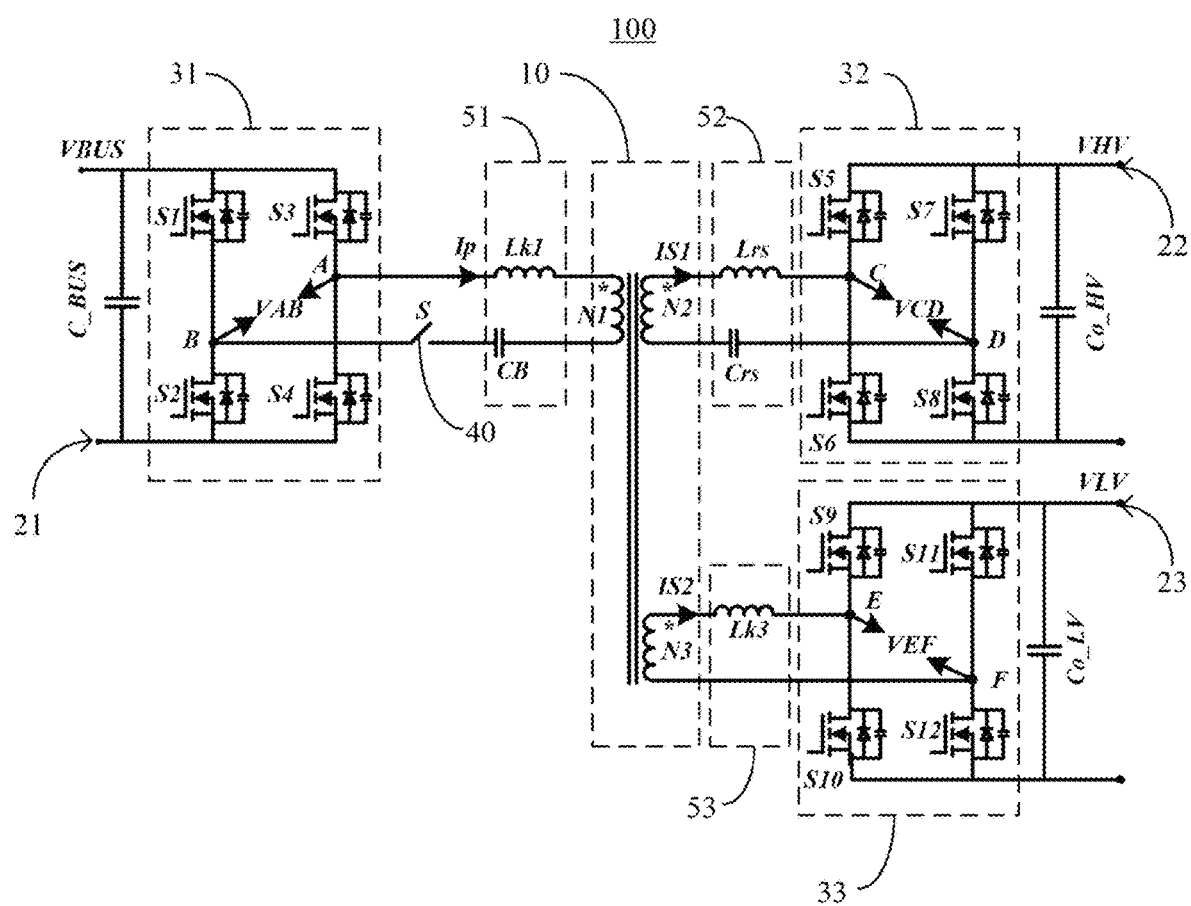
FIG. 3 is a structural diagram of a first embodiment of a charging and discharging device according to the invention.

FIG. 3 illustrates a circuit topological structure of a first embodiment of the charging and discharging device 100 according to the invention, which for example, may be applied to a charging and discharging system of an electric vehicle. The first port 21 may be connected to the AC/DC stage (i.e., the first charging and discharging unit) (omitted in the figure), the second port 22 may be connected to the high-voltage battery (i.e., the second charging and discharging unit), and the third port may be connected to the low-voltage battery (i.e., the third charging and discharging unit). The capacitors C_BUS, Co_Hv, and Co_Lv are filter capacitors corresponding to the three ports, respectively. A first controllable switch S is on the primary side of the transformer 10.

In this embodiment, the first conversion circuit 31 may comprise a first full-bridge circuit, and may, for example, be formed of switches S1-S4, wherein a potential difference between an intermediate node A of the switches S3 and S4 and an intermediate node B of the switches S1 and S2 is VAB. The second conversion circuit 32 may comprise a second full-bridge circuit, and may, for example, be formed of switches S5-S8, wherein a potential difference between an intermediate node C of the switches S5 and S6 and an intermediate node D of the switches S7 and S8 is VCD. The third conversion circuit 33 may comprise a third full-bridge circuit, and may, for example, be formed of switches S9-S12, wherein a potential difference between an intermediate node E of the switches S9 and S10 and an intermediate node F of the switches S11 and S12 is VEF. The three full-bridge circuits are designated to the three ports 21-23, respectively, and a bidirectional flow of energy among the three ports 21-23 can be achieved by controlling these circuits.

In this embodiment, the turn number of the primary winding of the transformer 10 is N1, the turn number of the first secondary winding is N2, and the turn number of the second secondary winding is N3.

In this embodiment, on the primary side of the transformer 10, the first conversion circuit 31 is electrically connected to the primary winding via the first resonance circuit 51, the first resonance circuit 51 comprises a first resonant inductor Lkl and a first resonant capacitor CB connected in series between the first conversion circuit 31 and the primary winding, and a current flowing the primary side is Ip. On a first secondary side of the transformer 10, the second conversion circuit 32 is electrically connected to the first secondary winding via the second resonance circuit 52, the second resonance circuit 52 comprises a second resonant inductor Lrs and a second resonant capacitor Crs connected in series between the second conversion circuit 32 and the first secondary winding, and a current flowing the first secondary side is IS1. On a second secondary side of the transformer 10, the third conversion circuit 33 is electrically connected to the second secondary winding via the third resonance circuit 53, the third resonance circuit 53 comprises a third resonant inductor Lk3 connected in series between the third conversion circuit 33 and the second secondary winding, and a current flowing the second secondary side is IS2.

The first resonant inductor may be a leakage inductance of the transformer, and the second resonant inductor and the third resonant inductor may be the leakage inductance of the transformer or separate inductors. The first resonant capacitor may be a blocking capacitor.

When the charging and discharging device 100 is in one of four working modes in which (a) the first charging and discharging unit charges the second charging and discharging unit, (b) the first charging and discharging unit charges the second charging and discharging unit and the third charging and discharging unit simultaneously, (c) the second charging and discharging unit is discharged to the first charging and discharging unit, and (d) the second charging and discharging unit is discharged to the first charging and discharging unit while charging the third charging and discharging unit, the first controllable switch S is on.

When the charging and discharging device 100 is in one of two working modes in which (e) the second charging and discharging unit supplies the third charging and discharging unit, or (f) the third charging and discharging unit pre-charges the second charging and discharging unit, the first controllable switch S is off. Here, the charging and discharging device 100 is a separate bidirectional control DC/DC.

Figure 4A:
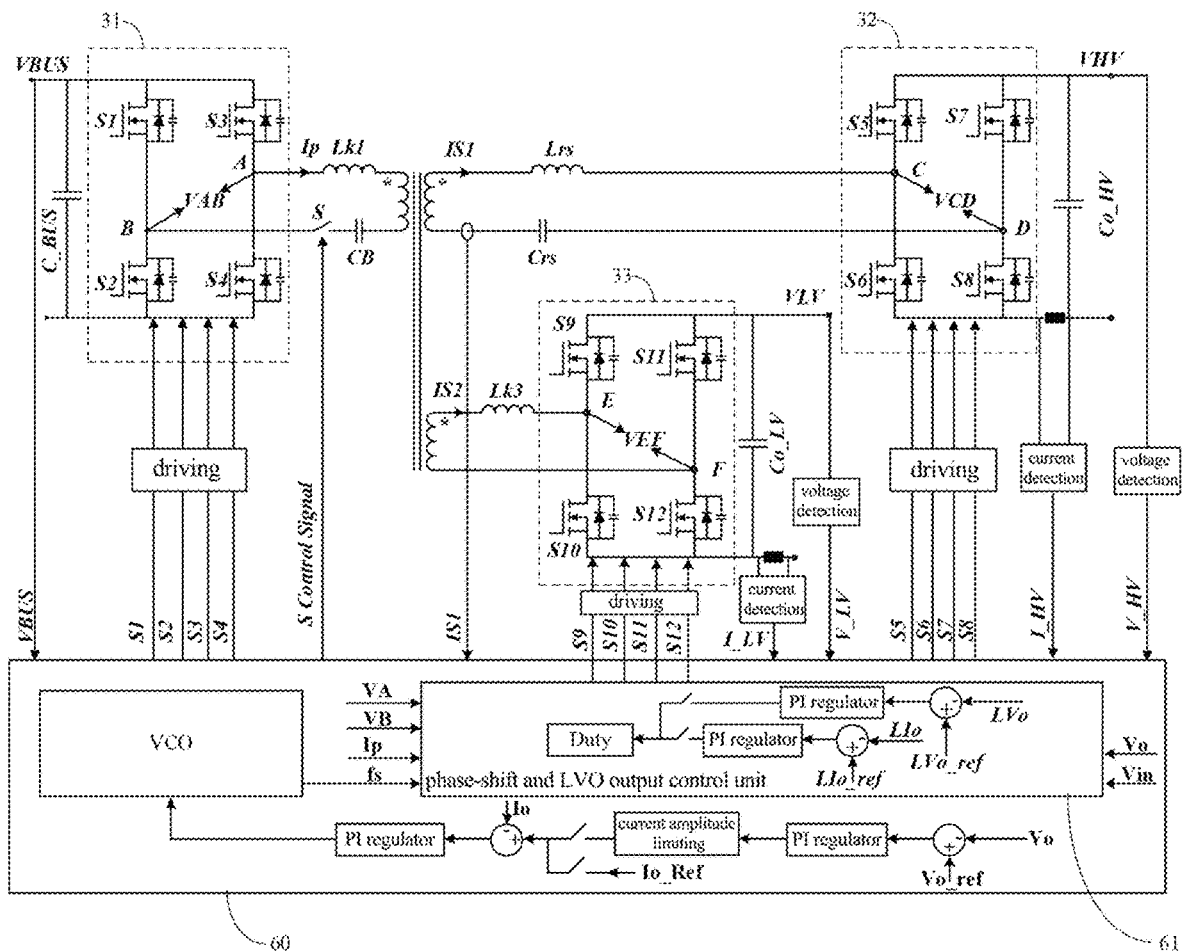
FIG. 4A is a structural diagram of a second embodiment of a charging and discharging device according to the invention.

FIG. 4A illustrates a circuit structure of a second embodiment of the charging and discharging device 100 according to the invention. As compared to the embodiment shown in FIG. 3, the charging and discharging device 100 may further comprise a controller 60 comprising a phase-shift control and frequency regulating unit 61 connected to the first conversion circuit 31, the second conversion circuit 32, and the third conversion circuit 33 for controlling the voltages at the second port 22 and the third port 23 through phase-shift control and frequency regulation.

When the charging and discharging device 100 is in one of working modes where the first charging and discharging unit charges the second charging and discharging unit, where the first charging and discharging unit charges the second charging and discharging unit and the third charging and discharging unit simultaneously, where the second charging and discharging unit is discharged to the first charging and discharging unit, and where the second charging and discharging unit is discharged to the first charging and discharging unit while charging the third charging and discharging unit, the voltages at the first port 21 and the second port 22 are controlled by controlling a phase shift or a switching frequency fs or a combination of the phase shift and the switching frequency fs of the first conversion circuit 31 and the second conversion circuit 32, while the voltage at the third port 23 is controlled by controlling a phase shift between the first conversion circuit 31 or the second conversion circuit 32 and the third conversion circuit 33.

When the charging and discharging device 100 is in a working mode where the second charging and discharging unit supplies the third charging and discharging unit, or a working mode where the third charging and discharging unit pre-charges the second charging and discharging unit, the voltage at the second port 22 or the third port 23 is controlled by controlling a switching frequency fs or a phase shift or a combination of the phase shift and the switching frequency fs of the second conversion circuit 32 and the third conversion circuit 33.

Figure 4B:
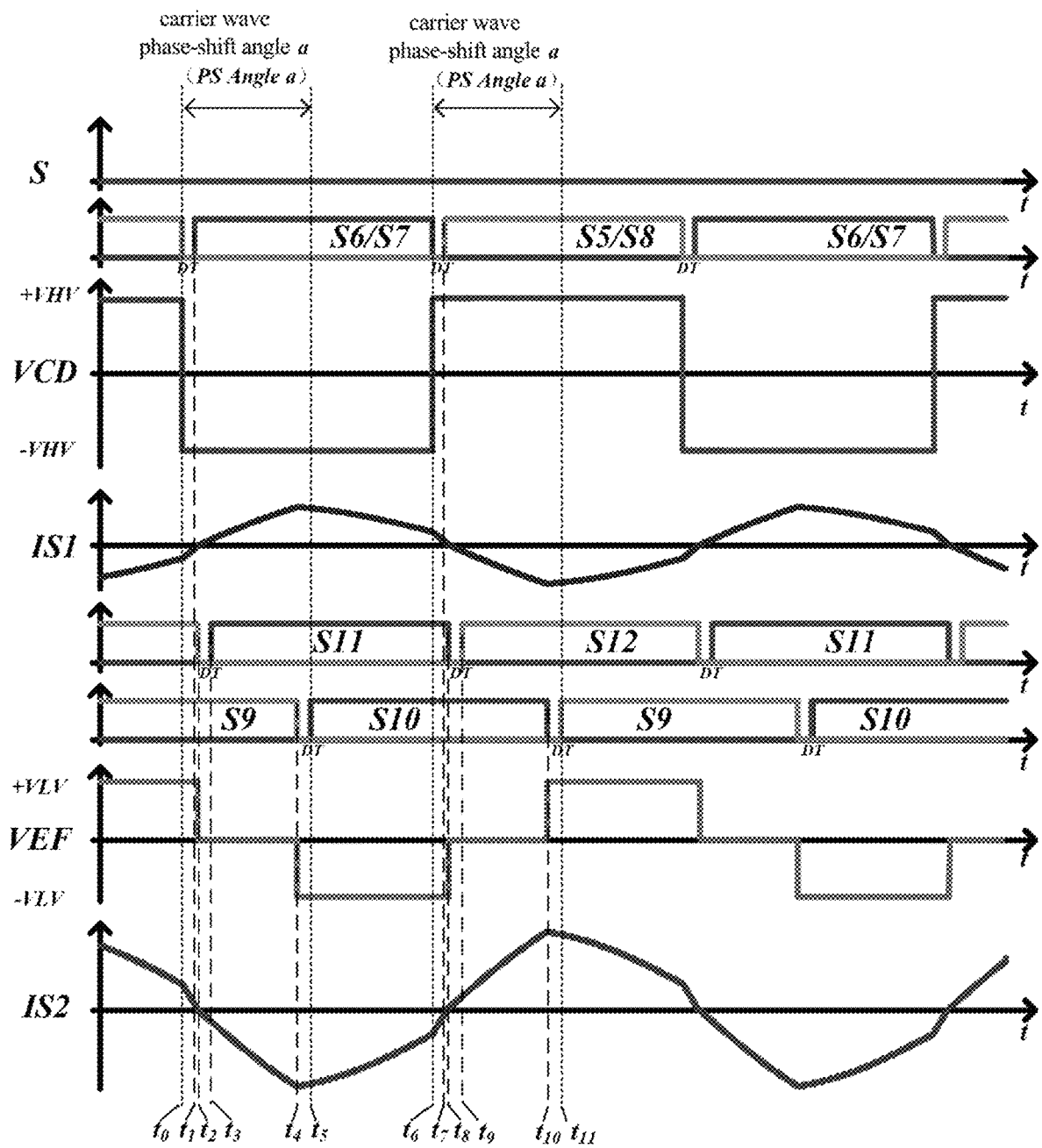
FIG. 4B is a schematic oscillogram of the charging and discharging device shown in FIG. 4A in a working mode where a second charging and discharging unit supplies a third charging and discharging unit.

FIG. 4B illustrates an oscillogram of the charging and discharging device 100 shown in FIG. 4A in a working mode where a second charging and discharging unit supplies a third charging and discharging unit. As can be seen from FIG. 4B, the second port and the third port may control the output of a power supply through the switching frequency and the phase-shift control. In this embodiment, there is a carrier wave phase-shift angle a between the switches S6, and the switch S10. Since a dead time is short, the carrier wave phase-shift angle a may or may not include the dead time t0-t1. That is, the carrier wave phase-shift angle a may be either t0-t5 or t1-t5. FIG. 4B takes t0-t5 as an example. The switches S11 and S12 are under synchronous rectification. In this working mode, the first controllable switch S is turned off. Due to symmetry of the circuits, the switch timing in a working mode where the third charging and discharging unit pre-charges the second charging and discharging unit is similar with the switch timing in a working mode where the second charging and discharging unit supplies the third charging and discharging unit, with the first controllable switch S being turned off also. The switch timing in the working mode of pre-charging is not described in detail.

Figure 5:
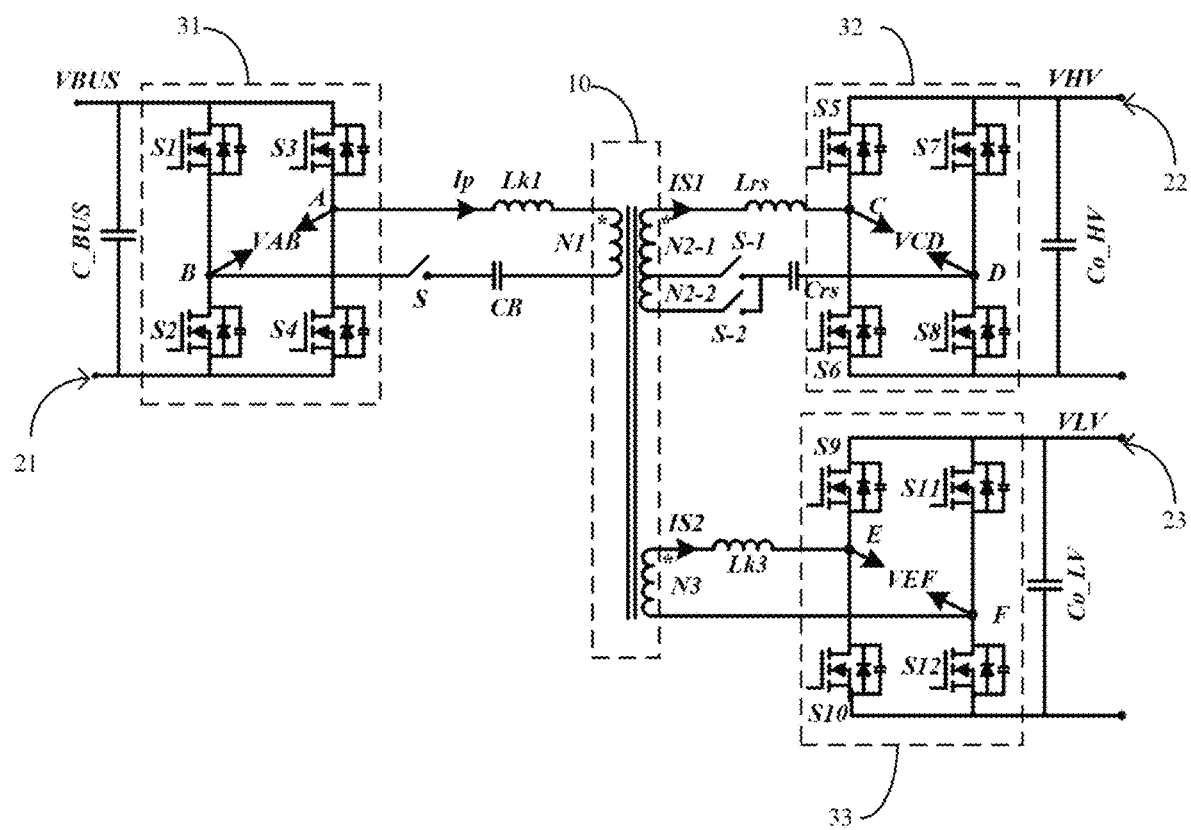
FIG. 5 is a structural diagram of a third embodiment of a charging and discharging device according to the invention.

FIG. 5 illustrates a circuit topological structure of a third embodiment of the charging and discharging circuit according to the invention. As compared to the embodiment shown in FIG. 3, the charging and discharging circuit further comprises a second controllable switch S-1 and a third controllable switch S-2 on the first secondary side of the transformer 10, in addition to the first controllable switch S on the primary side of the transformer 10. The turn number of the primary winding of the transformer is N1, the turn number of the second secondary winding is N3, a first winding portion between a first end and a third end of the first secondary winding has a first turn number of N2-1, and a second winding portion between the third end and a second end of the first secondary winding has a second turn number of N2-2. The second controllable switch S-1 is connected between the first winding portion and the second conversion circuit 32 and may be connected, for example, between the third end of the first secondary winding and the second resonant capacitor Crs of the second conversion circuit 32. The third controllable switch S-2 is connected between the second end of the first secondary winding and the second conversion circuit 32 and may be, for example, connected between the second end of the first secondary winding and the second resonant capacitor Crs.

Moreover, in the third embodiment shown in FIG. 5, when the charging and discharging device is in a working mode where the first port 21 charges the second port 22 and the third port 23, or a working mode where the second port 22 is discharged to the first port 21 while charging the third port 23, the first controllable switch S and the third controllable switch S-2 are turned on, and the second controllable switch S-1 is turned off. When the charging and discharging device is in a working mode where the second port 22 supplies the third port 23, or a working mode where the third port 23 pre-charges the second port 22, the first controllable switch S and the third controllable switch S-2 are turned off, and the second controllable switch S-1 is turned on. In such a way, a turn ratio of the first secondary side to the second secondary side may be regulated by switching the second controllable switch S-1 and the third controllable switch S-2. In the working mode of EV running in which the second port 22 supplies the third port 23, the influence of a large phase-shift angle when the second secondary side outputs a high voltage can be diminished by reducing the turn ratio of the first secondary side to the second secondary side, thereby decreasing a reactive current, and reducing loss.

Figure 6:
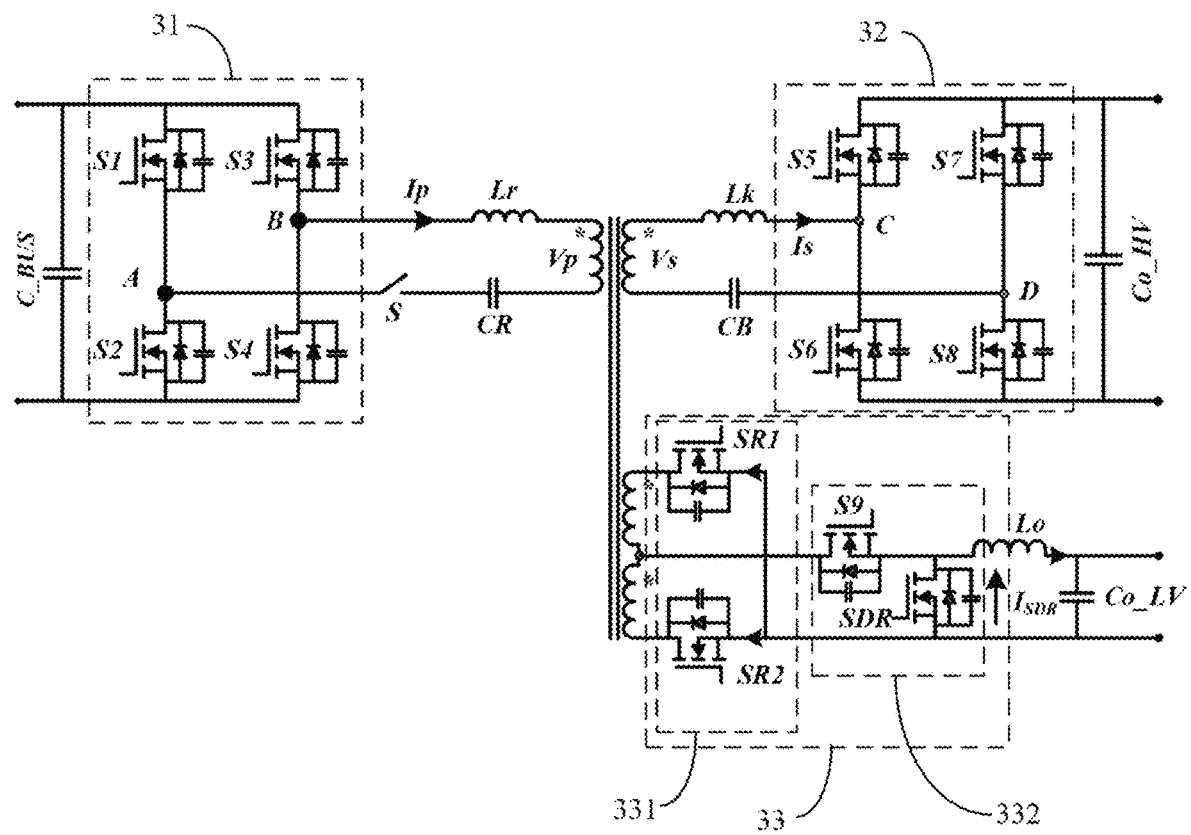
FIG. 6 is a structural diagram of a fourth embodiment of a charging and discharging device according to the invention.

FIG. 6 illustrates a circuit topological structure of a fourth embodiment of the charging and discharging device according to the invention. It differs from the embodiment shown in FIG. 3 in that the third conversion circuit 33 may be a two-stage conversion circuit comprising a synchronizing rectifier circuit 331 (comprising switches SR1 and SR2, for example) at a first stage and a BUCK circuit 332 (comprising switches S9 and SDR, for example) at a second stage.

Figure 7:
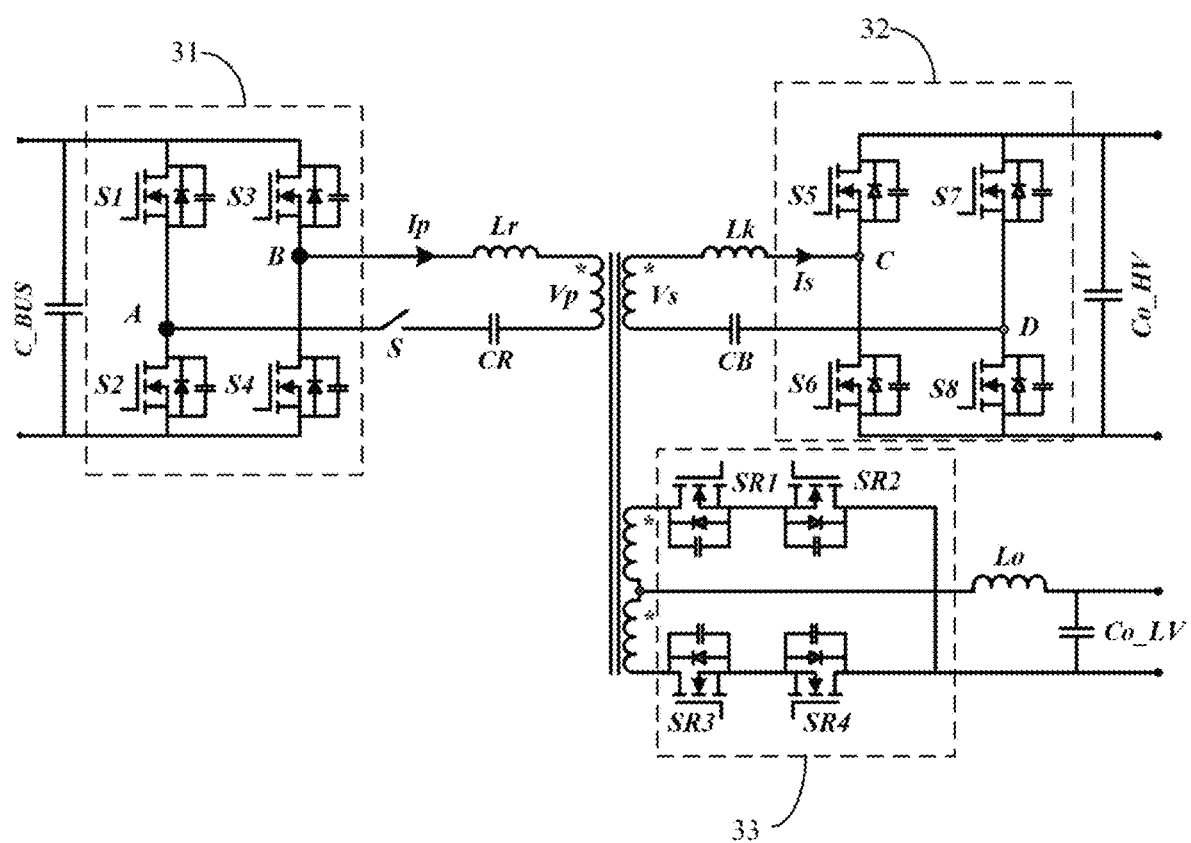
FIG. 7 is a structural diagram of a fifth embodiment of a charging and discharging device according to the invention.

FIG. 7 illustrates a circuit topological structure of a fifth embodiment of the charging and discharging device according to the invention. It differs from the embodiment shown in FIG. 3 in that the third conversion circuit 33 may be a bidirectional controllable rectifier circuit comprising, for example, switches SR1-SR4.

Figure 8:
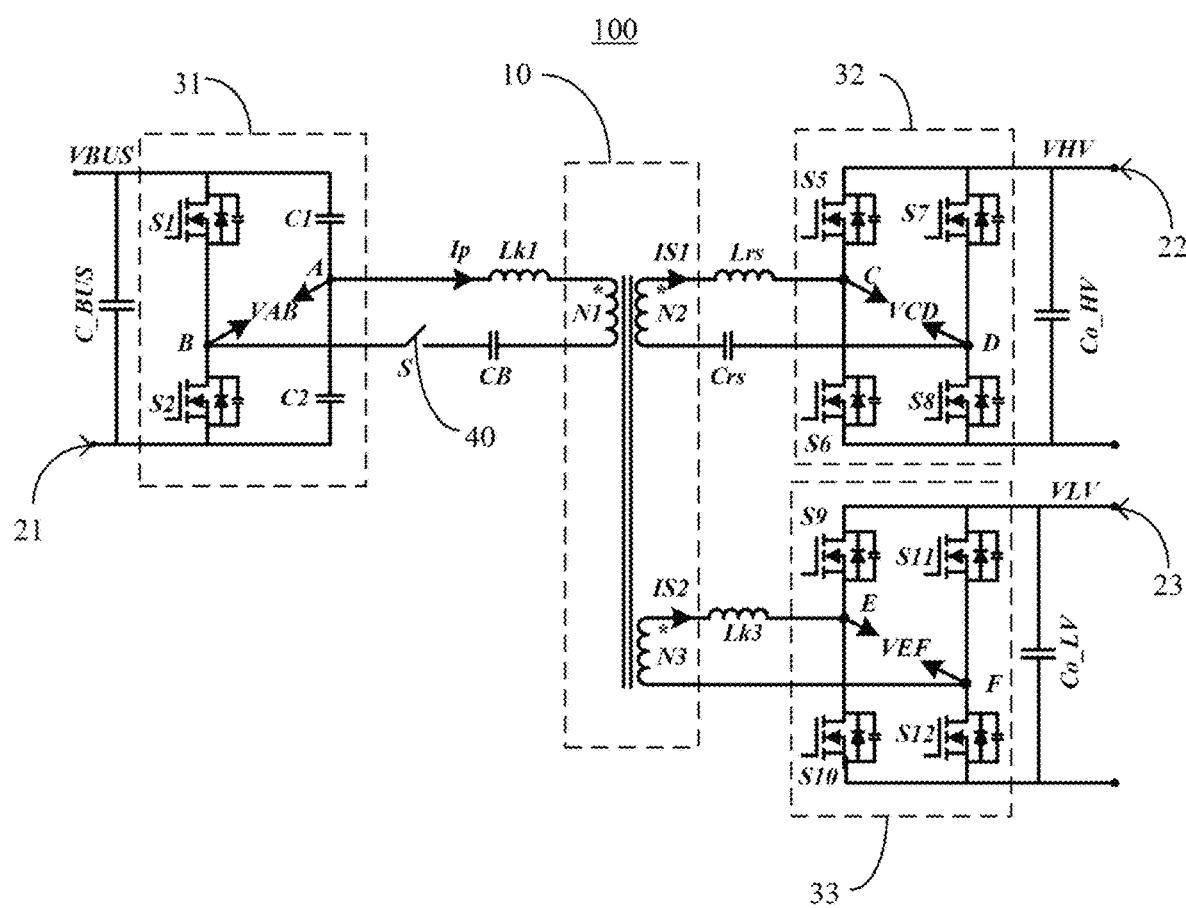
FIG. 8 is a structural diagram of a sixth embodiment of a charging and discharging device according to the invention.

FIG. 8 illustrates a circuit topological structure of a sixth embodiment of the charging and discharging device according to the invention. It differs from the embodiment shown in FIG. 3 in that the first conversion circuit 31 may be a first half-bridge circuit comprising, for example, the switches S1-S2, the second conversion circuit 32 may be a second full-bridge circuit comprising, for example, the switches S5-S8, and the third conversion circuit 33 may be a third full-bridge circuit comprising, for example, the switches S9-S12. This embodiment can reduce the number of switching devices, optimize cost, and optimize the efficiency of the charger during low voltage output.

Figure 9:
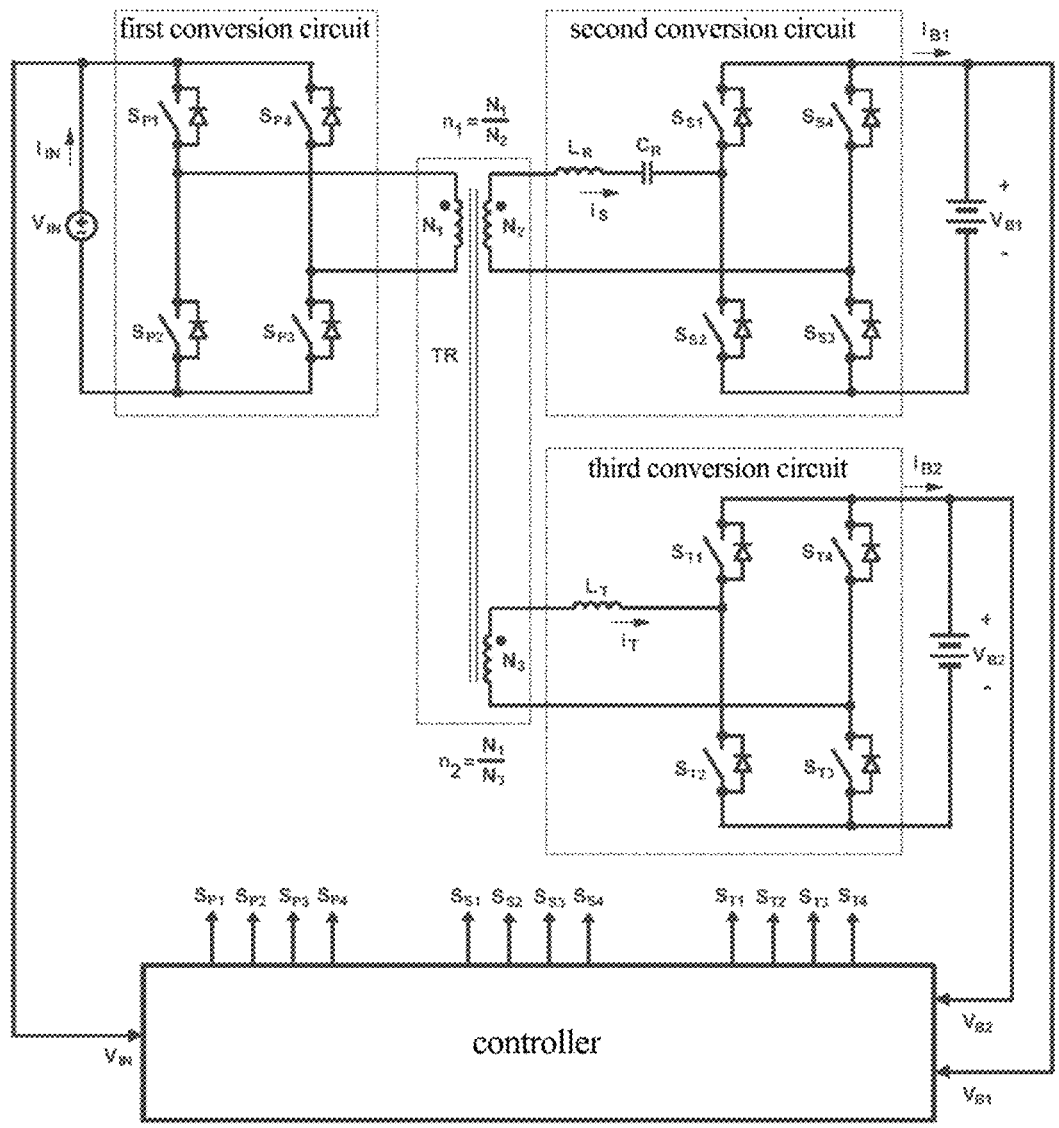
FIG. 9 is a structural diagram of a seventh embodiment of a charging and discharging device according to the invention.

FIG. 9 illustrates a circuit topological structure of a seventh embodiment of the charging and discharging device according to the invention, wherein the charging and discharging device is in a structure of a multi-port bidirectional DC-DC converter. The multi-port bidirectional DC-DC converter in FIG. 9 comprises an isolation transformer and three conversion circuits. The first conversion circuit of the transformer comprises switches $S_{p1}$, $S_{p2}$, $S_{p3}$, and $S_{p4}$ and is electrically connected between a voltage source $V_{IN}$ and a first winding $N_1$ of the transformer $T_R$. The second conversion circuit of the transformer comprises switches $S_{S1}$, $S_{S2}$, $S_{S3}$, $S_{S4}$, a resonant capacitor $C_R$, and a resonant inductor $L_R$. The third conversion circuit comprises switches $S_{T1}$, $S_{T2}$, $S_{T3}$, $S_{T4}$, and a series inductor $L_T$. Moreover, the second conversion circuit is electrically connected between a power supply $V_{B1}$ and a second winding $N_2$ of the transformer $T_R$, and the third conversion circuit is electrically connected between a power supply $V_{B2}$ and a third winding $N_3$ of the transformer $T_R$. It should be noticed that in some embodiments it may be necessary to couple an EMI filter between each energy supply and each conversion circuit. Since the EMI filter is irrelevant to the working state of the transformer in this invention, the EMI filter is left out in the figures of the relevant embodiments to simplify the figures and related explanations.

The three-port bidirectional DC-DC converter in FIG. 9 can deliver and regulate a voltage and a current in any direction. For example, the transformer is controlled by a controller to deliver energy from the voltage source $V_{IN}$ to the batteries $V_{B1}$ and $V_{B2}$, thereby charging the batteries $V_{B1}$ and $V_{B2}$. Similarly, the energy of the battery $V_{B1}$ may be delivered to the voltage source $V_{IN}$ and the battery $V_{B2}$, and the energy of the battery $V_{B2}$ may also be delivered to the voltage source $V_{IN}$ and the battery $V_{B1}$ by independently controlling a charging current. To independently regulate voltages at multiple output ends or the power supplies, a variable-frequency control, a delay time control, a phase-shift control, or a combination of two or three of these controls may be employed.

The invention further provides a charging and discharging system of an electric vehicle, comprising the charging and discharging device as stated above, wherein a first port of the charging and discharging device is connected to an AC/DC rectifier and inversion unit, a second port of the charging and discharging device is connected to a first charging and discharging unit, and a third port of the charging and discharging device is connected to a second charging and discharging unit.

By adding a controllable switch S, the invention has at least one of the following advantages:

(1) the design is optimized by eliminating the limitation between the turn number of the primary winding and the turn number of the respective secondary windings in a conventional three-port magnetic integration solution;

(2) the cost is controllable since only one controllable switch needs to be added to the circuit;

(3) the path of energy to the bus capacitor is cut off when the vehicle is in an EV running mode so that on one hand, the risk of a high voltage on the bus side is eliminated, and on the other hand, efficiency may be optimized since the third conversion circuit does not need to be switched to a half-bridge; and (4) the reactive power output from the LV side may be reduced by optimizing the design of the turn ratio on the primary side, thereby reducing loss.

Figure 10A:
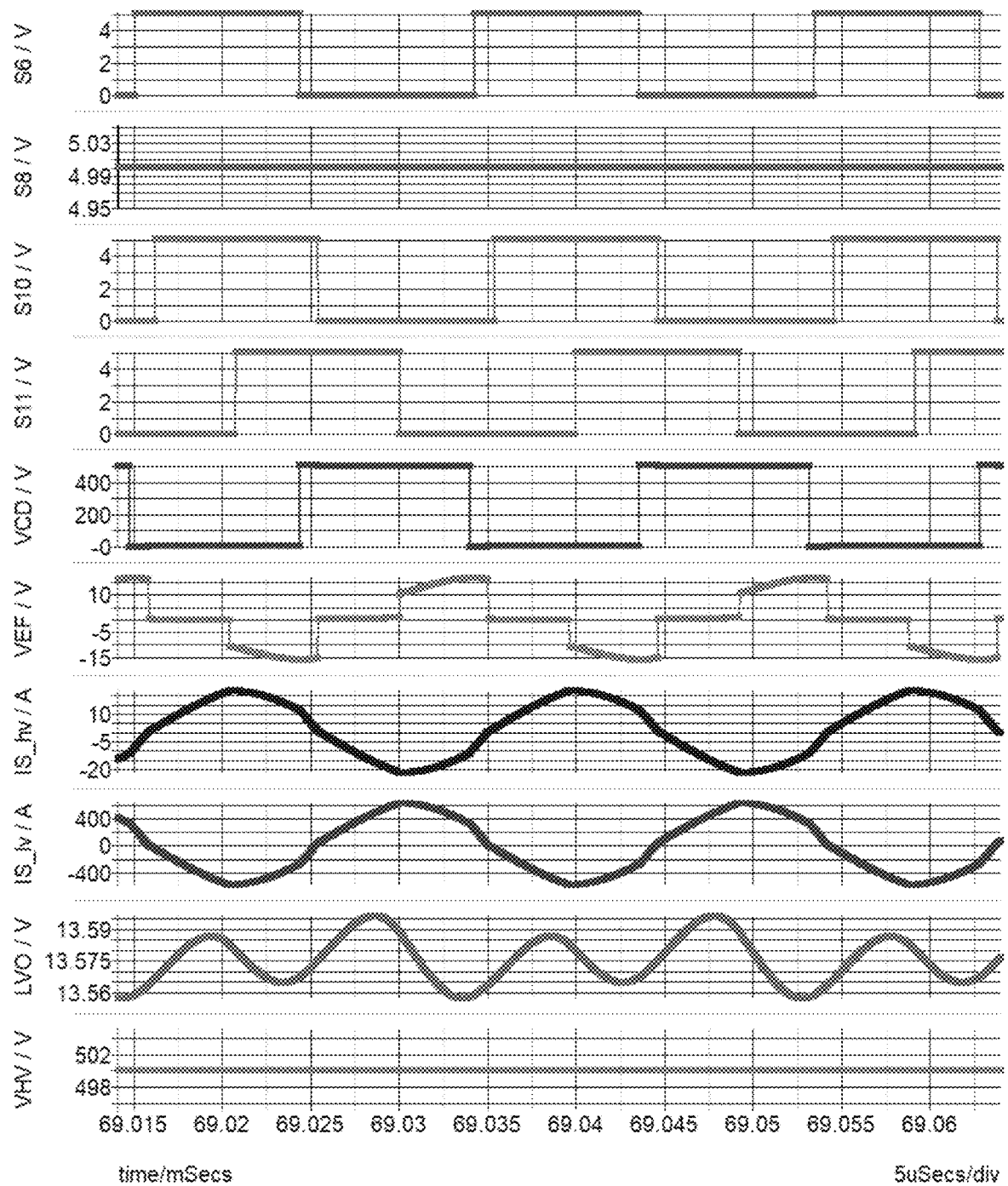
FIG. 10A is simulation waveforms of a charging and discharging device when it is in a working mode where a second charging and discharging unit supplies a third charging and discharging unit and a first controllable switch is not adopted.
Figure 10B:
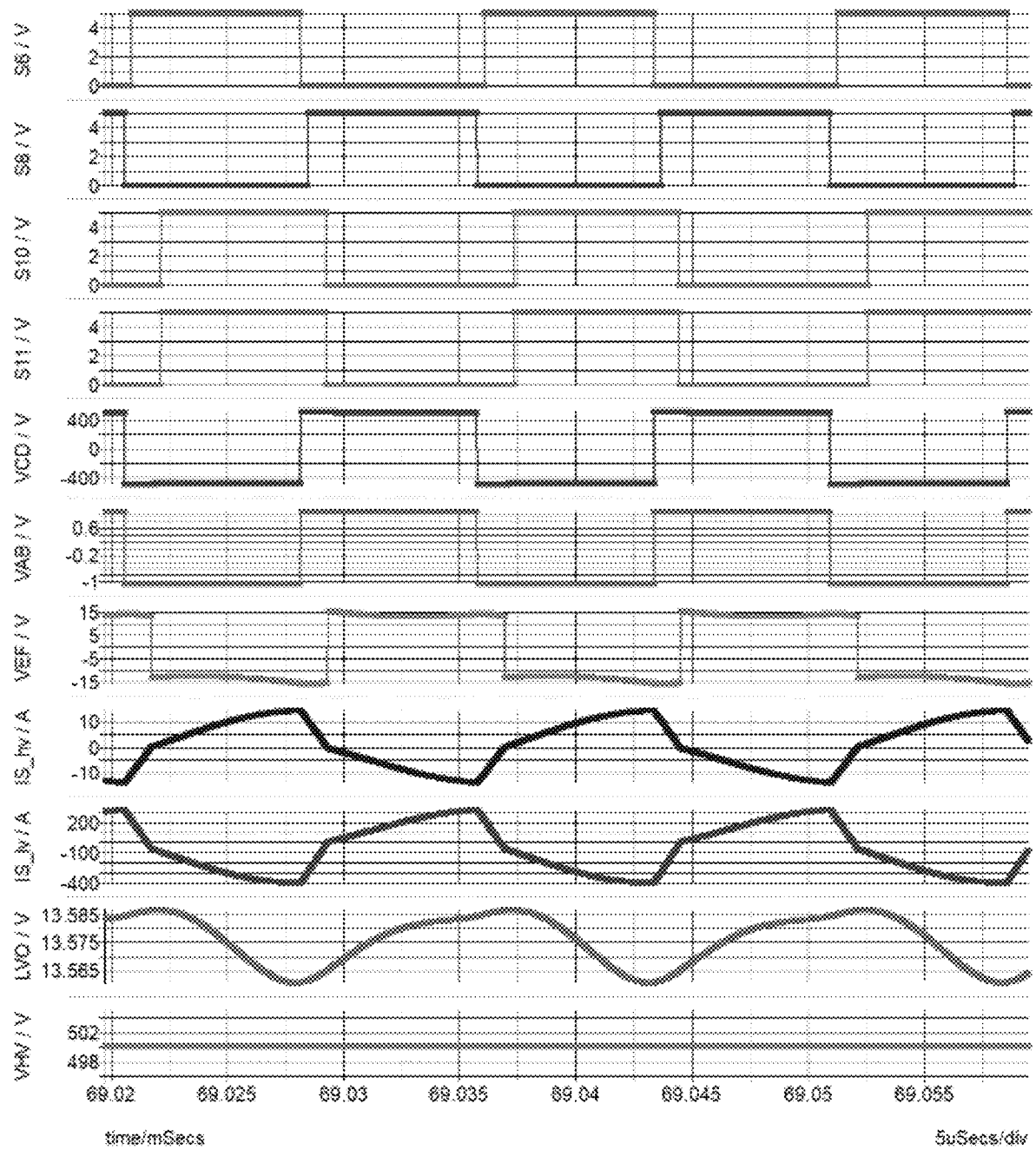
FIG. 10B is simulation waveforms of a charging and discharging device when it is in a working mode where a second charging and discharging unit supplies a third charging and discharging unit and a first controllable switch is adopted.

For example, when the charging and discharging device is in a working mode where the second charging and discharging unit supplies the third charging and discharging unit, FIG. 10A illustrates simulation waveforms without a first controllable switch S and FIG. 10B illustrates simulation waveforms with a first controllable switch S being adopted. IS_hv is a waveform of a resonant current on the HV side, and IS_lv is a waveform of the resonant current on the LV side. As can be seen from the comparison of FIGS. 10A and 10B, in a circuit without the first controllable switch S, due to consideration of limitation of withstand voltage of a BUS capacitor on the primary side, in the working mode of EV running, the HV side may be switched into a half-bridge mode when the voltage on the HV side is very high; while in a circuit adopting the first controllable switch S, the HV side can work in a full-bridge mode, and the resonant currents on the HV side and the LV side are small, thereby achieving the object of optimizing efficiency.

Exemplary embodiments of the invention have been shown and described in detail. It shall be understood that the invention is not limited to the disclosed embodiments. Instead, the invention intends to cover various modifications and equivalent settings included in the spirit and scope of the appended claims.

What is claimed is:

1. A charging and discharging device, comprising:
   a transformer comprising a primary winding and multiple secondary windings, which comprises at least a first secondary winding and a second secondary winding;
   multiple ports electrically connected to the primary winding and the multiple secondary windings of the transformer, respectively, wherein the multiple ports at least comprise:
   a first port electrically connected to the primary winding via a first conversion circuit, the first port is a DC port;
   a second port electrically connected to the first secondary winding via a second conversion circuit; and
   a third port electrically connected to the second secondary winding via a third conversion circuit;
   a first filter capacitor connected in parallel to the first port; and
   a first controllable switch connected between the first conversion circuit and the primary winding;
   wherein a voltage at the first port of the charging and discharging device is a first voltage, a voltage at the second port is a second voltage, and a voltage at the third port is a third voltage,
   wherein the first port is electrically connected to a first charging and discharging unit, the second port is electrically connected to a second charging and discharging unit, and the third port is electrically connected to a third charging and discharging unit; a first winding portion between a first end and a third end of the first secondary winding has a first turn number, a second winding portion between the third end and a second end of the first secondary winding has a second turn number, a second controllable switch is connected between the first winding portion and the second conversion circuit, and a third controllable switch is connected between the second end of the first secondary winding and the second conversion circuit;
   wherein when the charging and discharging device is in a working mode where the first charging and discharging unit charges the second charging and discharging unit and the third charging and discharging unit simultaneously, or a working mode where the second charging and discharging unit is discharged to the first charging and discharging unit while charging the third charging and discharging unit, the first controllable switch and the third controllable switch are on, and the second controllable switch is off; and
   when the charging and discharging device is in a working mode where the second charging and discharging unit supplies the third charging and discharging unit or a working mode where the third charging and discharging unit pre-charges the second charging and discharging unit, the first controllable switch and the third controllable switch are off, and the second controllable switch is on.

2. The charging and discharging device according to claim 1, wherein the third voltage is smaller than the second voltage.

3. The charging and discharging device according to claim 1, wherein the first port is electrically connected to a first charging and discharging unit, the second port is electrically connected to a second charging and discharging unit, the third port is electrically connected to a third charging and discharging unit, and when the charging and discharging device is in one of a plurality of working modes where the first charging and discharging unit charges the second charging and discharging unit, where the first charging and discharging unit charges the second charging and discharging unit and the third charging and discharging unit simultaneously, where the second charging and discharging unit is discharged to the first charging and discharging unit, and where the second charging and discharging unit is discharged to the first charging and discharging unit while charging the third charging and discharging unit, the first controllable switch is on.

4. The charging and discharging device according to claim 1, wherein the first port is electrically connected to a first charging and discharging unit, the second port is electrically connected to a second charging and discharging unit, the third port is electrically connected to a third charging and discharging unit, and when the charging and discharging device is in a working mode where the second charging and discharging unit supplies the third charging and discharging unit, or in a working mode where the third charging and discharging unit pre-charges the second charging and discharging unit, the first controllable switch is off.

5. The charging and discharging device according to claim 1, further comprising:
a second filter capacitor connected in parallel to the second port; and
a third filter capacitor connected in parallel to the third port.

6. The charging and discharging device according to claim 1, wherein,
the first conversion circuit comprises a first full-bridge circuit, the second conversion circuit comprises a second full-bridge circuit, and the third conversion circuit comprises a third full-bridge circuit.

7. The charging and discharging device according to claim 1, wherein the first conversion circuit is electrically connected to the primary winding via a first resonance circuit, the second conversion circuit is electrically connected to the first secondary winding via a second resonance circuit, and the third conversion circuit is electrically connected to the second secondary winding via a third resonance circuit.

8. The charging and discharging device according to claim 7, wherein the first resonance circuit comprises a first resonant inductor and a first resonant capacitor, wherein the first resonant inductor and the first resonant capacitor are connected in series between the first conversion circuit and the primary winding, respectively;
wherein the second resonance circuit comprises a second resonant inductor and a second resonant capacitor, wherein the second resonant inductor and the second resonant capacitor are connected in series between the second conversion circuit and the first secondary winding, respectively; and wherein the third resonance circuit comprises a third resonant inductor, wherein the third resonant inductor is connected in series between the third conversion circuit and the second secondary winding.

9. The charging and discharging device according to claim 8, wherein the first resonant inductor is a leakage inductance of the transformer, and the second resonant inductor and the third resonant inductor are the leakage inductance of the transformer or separate inductors.

10. The charging and discharging device according to claim 1, wherein,
the first conversion circuit comprises a first full-bridge circuit, the second conversion circuit comprises a second full-bridge circuit, and the third conversion circuit is a two-stage conversion circuit comprising a synchronizing rectifier circuit at a first stage and a BUCK circuit at a second stage.

11. The charging and discharging device according to claim 1, wherein,
the first conversion circuit comprises a first full-bridge circuit, the second conversion circuit comprises a second full-bridge circuit, and the third conversion circuit is a bidirectional controllable rectifier circuit.

12. The charging and discharging device according to claim 1, wherein,
the first controllable switch is connected between a first end or a second end of the primary winding and the first conversion circuit.

13. The charging and discharging device according to claim 1, further comprising:
a controller that comprises a phase-shift control and frequency regulating unit connected to the first conversion circuit, the second conversion circuit, and the third conversion circuit for controlling the voltages at the second port and the third port.

14. The charging and discharging device according to claim 13, wherein the first port is electrically connected to a first charging and discharging unit, the second port is electrically connected to a second charging and discharging unit, the third port is electrically connected to a third charging and discharging unit, and when the charging and discharging device is in one of a plurality of working modes where the first charging and discharging unit charges the second charging and discharging unit, where the first charging and discharging unit charges the second charging and discharging unit and the third charging and discharging unit simultaneously, where the second charging and discharging unit is discharged to the first charging and discharging unit, and where the second charging and discharging unit is discharged to the first charging and discharging unit while charging the third charging and discharging unit, the voltages at the first port and the second port are controlled by controlling a phase shift or a switching frequency or a combination of the phase shift and the switching frequency of the first conversion circuit and the second conversion circuit, while the voltage at the third port is controlled by controlling a phase shift of the first conversion circuit or the second conversion circuit with the third conversion circuit.

15. The charging and discharging device according to claim 13, wherein the first port is electrically connected to a first charging and discharging unit, the second port is electrically connected to a second charging and discharging unit, the third port is electrically connected to a third charging and discharging unit, and when the charging and discharging device is in a working mode where the second charging and discharging unit supplies the third charging and discharging unit, or a working mode where the third charging and discharging unit pre-charges the second charging and discharging unit, the voltage at the second port or the third port is controlled by controlling a switching frequency or a phase shift or a combination of the phase shift and the switching frequency of the second conversion circuit and the third conversion circuit.

16. The charging and discharging device according to claim 1, wherein the first controllable switch is a mechanical structure switch or a controllable bidirectional switch.

17. The charging and discharging device according to claim 1, wherein the first port is electrically connected to a first charging and discharging unit, the second port is electrically connected to a second charging and discharging unit, the third port is electrically connected to a third charging and discharging unit, and when the charging and discharging device is in one of working modes where the third charging and discharging unit pre-charges the first charging and discharging unit or where the second charging and discharging unit pre-charges the first charging and discharging unit, the first controllable switch is on.

18. The charging and discharging device according to claim 1, wherein,
the first conversion circuit comprises a first half-bridge circuit, the second conversion circuit comprises a second full-bridge circuit, and the third conversion circuit comprises a third full-bridge circuit.

19. A charging and discharging system of an electric vehicle, comprising:
the charging and discharging device according to claim 1, wherein a first port of the charging and discharging device is connected to a first charging and discharging unit, a second port of the charging and discharging device is connected to a second charging and discharging unit, and a third port of the charging and discharging device is connected to a third charging and discharging unit.

* * * * *